United States Patent
Bechtel et al.

(10) Patent No.: US 6,975,287 B2
(45) Date of Patent: Dec. 13, 2005

(54) PLASMA COLOR DISPLAY SCREEN WITH PIXEL MATRIX ARRAY

(75) Inventors: Hans-Helmut Bechtel, Roetgen (DE); Wolfgang Busselt, Roetgen (DE); Harald Glaeser, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 392 days.

(21) Appl. No.: 10/143,644

(22) Filed: May 10, 2002

(65) Prior Publication Data

US 2002/0190648 A1 Dec. 19, 2002

(30) Foreign Application Priority Data

May 12, 2001 (DE) ................. 101 23 235

(51) Int. Cl.$^7$ ............................................. G09G 3/28
(52) U.S. Cl. ....................... 345/72; 315/169.4; 313/483
(58) Field of Search ................. 345/60–72; 315/169.1, 315/169.4; 313/483–512; G09G 3/28; H01J 1/62, H01J 63/04, 17/16

(56) References Cited

U.S. PATENT DOCUMENTS

| 5,661,500 A | * | 8/1997 | Shinoda et al. ................ 345/60 |
| 5,763,139 A | * | 6/1998 | Matsunaga et al. ......... 430/313 |
| 5,825,128 A | * | 10/1998 | Betsui et al. ................ 313/582 |
| 6,577,061 B2 | * | 6/2003 | Sano et al. .................. 313/582 |

FOREIGN PATENT DOCUMENTS

| EP | 709821 | * | 5/1996 | ............ G09G 3/28 |
| JP | 2000-100332 | * | 4/2000 | ............ H01J 11/02 |
| JP | 2000260331 | * | 9/2000 | ............ H01J 11/02 |
| WO | WO9711477 | | 3/1997 | ............ H01J 17/49 |

* cited by examiner

Primary Examiner—Alexander Eisen

(57) ABSTRACT

A plasma color screen fitted with a carrier plate, a transparent front plate, a ribbed structure dividing the space between the carrier plate and the front plate into discharge cells filled with a gas, with one or more electrode arrays on the front plate and on the carrier plate to generate corona discharges in the discharge cells and with a segmented phosphor layer, which plasma color screen comprises a pixel matrix array in which are grouped discharge cells for red, green and blue to form a pixel, where each pixel comprises a discharge cell for blue which is common to two adjacent pixels.

4 Claims, 2 Drawing Sheets

PLASMA COLOR DISPLAY SCREEN WITH PIXEL MATRIX ARRAY

The invention concerns a plasma screen fitted with a carrier plate, a transparent front plate, a ribbed structure which divides the space between the carrier plate and the front plate into discharge cells filled with a gas, with one or more electrode arrays on the front plate and on the carrier plate to generate corona discharges in the discharge cells, which plasma screen comprises a pixel matrix array in which are grouped discharge cells for three colors namely red, green and blue to form a pixel.

The basic principle of a plasma screen is that the crossed electrode arrays between a carrier plate and a transparent front plate form a matrix, between the intersecting individual electrodes of which the voltage can be controlled so that at the points of intersection a gas discharge takes place. The resulting luminescent gas plasma is characterized by a transparent front plate as the luminous point.

In the color version of the plasma screen the screen comprises a structured phosphor layer with segments to generate the colors red, green and blue. A pixel i.e. a picture element, comprises three sub-pixels for the three primary colors each on a segment of the phosphor layer. Usually, in a plasma color screen the segments of the phosphor layer are arranged next to each other, each time for three sub-pixels, in elongated phosphor strips and all segments have the same geometric form.

An image is generated when the UV radiation created in the plasma is incident on the phosphor of a sub-pixel of a triplet and this phosphor lights more or less brightly in its color. The sub-pixels of a triplet lie so close together that the human eye perceives them as one picture element.

The phosphors for the sub-pixels in red, green and blue however have different properties as regards their long-term behavior but also in color saturation and perceptibility.

It has already been proposed that the different behavior of red, green and blue sub-pixels be compensated by a different geometric form and arrangement of the sub-pixels.

WO 97/11477 discloses a plasma color screen comprising a pixel matrix array, in which are grouped discharge cells for three colors, namely red, green and blue, to form a pixel, the pixel comprising a blue discharge cell with a length smaller than the total length of the pixel and a width corresponding to the width of the pixel, and red and green discharge cells arranged laterally next to each other, the red and green discharge cells having a length corresponding to the difference between the total pixel length and the length of the blue pixel, and a width equal to less than half the total pixel width. This enables the differences in luminance between the three types of discharge cells to be compensated and a better white balance and optimum luminance to be achieved.

In this plasma color screen the individual pixels are larger than in the conventional plasma color screen as the area of the blue discharge cell is 1.5 to 2 times larger than the area of the red and green discharge cells.

It is however a disadvantage—even in the conventional plasma color screens—that the pixel size cannot be reduced sufficiently.

It is an object of the present invention to create a plasma color screen with improved resolution or improved luminance.

According to the invention, this object is achieved by a plasma screen fitted with a carrier plate, a transparent front plate, a ribbed structure which divides the space between the carrier plate and front plate into discharge cells filled with a gas, with one or more electrode arrays on the front plate and on the carrier plate to generate corona discharges in the discharge cells, and with a segmented phosphor layer, which plasma screen comprises a pixel matrix array in which are grouped discharge cells for red, green and blue to form a pixel, where each pixel comprises a discharge cell for blue which is common to two adjacent pixels.

The invention is based on the concept that the human eye perceives a radiation density for different colors as a clearly different brightness or luminance. In contrast, the perceived color in the case of additive color mixing—as in color plasma screens—is determined essentially by the radiation density of the individual primary colors. The sensitivity of the human eye is greatest for green light, followed by red and blue. As a result the perceived spatial resolution is determined above all by the spatial resolution of the green- and red-emitting color surfaces of the green and red discharge cells. Blue light from the blue discharge cells contributes mainly to the color effect and less to the reproduction of the blue structures. Therefore in a plasma color screen with this pixel matrix array it is possible to reduce the number of blue sub-pixels or discharge cells for blue.

The invention offers particularly advantageous effects in relation to the state of the art if the discharge cells are arranged in parallel elongated channels. If the discharge cells are arranged in parallel channels it is possible, at the same dimensions of the plasma color screen, to increase the channel width by one-sixth in relation to conventional plasma color screens while the number of pixels remains the same. As the channel width increases the electro-optical efficiency of the phosphors increases because the UV radiation from the plasma is spread over a larger area and the luminance rises. In addition, the number of address electrodes and associated column drivers is reduced by one-sixth, which reduces the production costs.

It is particularly preferred that the segment of the phosphor layer of the discharge cell for blue contains europium (II)-doped barium magnesium aluminate (BAM). Europium (II)-doped barium magnesium aluminate as a blue-emitting phosphor shows no saturation up to high luminances in the case of VUV excitation. In contrast, the known green and red phosphors for plasma color screens become saturated, i.e. their electro-optical efficiency diminishes as the excitation density increases. With europium(II)-doped barium magnesium aluminate as a blue-emitting phosphor, the sum of the blue luminance parts of two adjacent pixels can be shown on a blue sub-pixel without the white luminance of the plasma color screen being reduced.

In a further embodiment of the invention each pixel can comprise a blue and a red discharge cell which are each common to two adjacent pixels. As a result the number of pixels on a predetermined image screen area can be increased further. However, the number of pixels can also be kept constant. Then the channel width is increased in relation to the state of the art by one-third and the number of address electrodes and associated column drivers reduced by one-third.

The invention is explained hereinbelow with reference to three Figures and one Figure that relates to the state of the art.

FIG. 1 shows a plasma color screen of the surface discharge type which comprises a layer system of individual layers applied so as to be superposed and partly juxtaposed.

Figure 1:
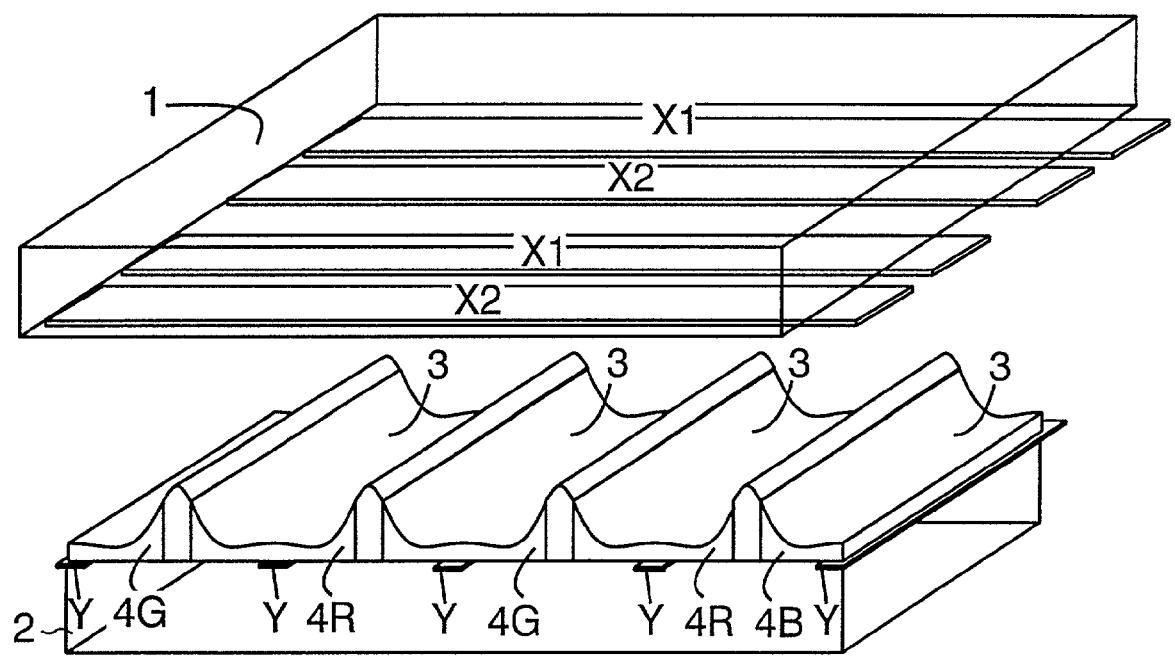
FIG. 1 shows diagrammatically in cross section the structure of an embodiment of a plasma color screen of the surface discharge type according to the invention.

In a plasma color screen of the surface discharge type, light is generated in a plasma by gas discharge in a three-electrode system. The three-electrode system consists of an address electrode and two discharge electrodes per pixel element, between which an alternating voltage is applied in operation.

The plasma color screen is composed of a transparent front plate and a carrier plate which are held at a distance from each other and are sealed hermetically at the periphery. The space between the two plates forms the discharge space 3.

The front plate comprises a front substrate 1, an array of discharge electrodes X1 and X2 on the inner surface of the carrier substrate and a transparent dielectric layer which covers the discharge electrodes.

The dielectric layer is covered with a protective layer of magnesium oxide which reduces the ignition voltage for the gas discharge and prevents the dielectric layer from being sputtering off during gas discharge.

In the embodiment shown the discharge electrodes are arranged in pairs on either side of a discharge channel at a greater distance to the next pair of discharge electrodes. Each discharge electrode is designed as a compound electrode of a transparent strip electrode and a metal bus electrode. The bus electrode is narrower than the transparent strip electrode and the strip electrode is partly covered by the bus electrode.

The carrier plate comprises a carrier substrate 2, address electrodes Y and phosphor layers 4R, 4G and 4B. The address electrodes extend at right angles to the drawing plane and transversely to the direction of the discharge electrodes so that a discharge can be ignited at each point of intersection. Preferably the discharge electrodes are made of metal which like aluminum and silver for example is highly reflective in the visible spectral region.

Individually controllable discharge cells are formed by a ribbed structure with separating ribs. A ribbed structure with straight parallel separating ribs divides the discharge space into uninterrupted vertical strips.

A ribbed structure with kinked or curved separating ribs divides the discharge space into discharge cells, arranged like a bead-string vertically next to each other, with for example a hexagonal or ellipsoid cross-section.

Between the separating ribs the front plate is coated with a phosphor layer of phosphor segments. A picture element i.e. a pixel, is defined by a combination of at least three sub-pixels in the colors red, green and blue. The sub-pixels are produced by the three luminescent phosphor segments 4G, 4R and 4B in the colors red, green and blue. Three discharge cells with a red, a green and a blue phosphor segment each form a sub-pixel and, as a triplet, a picture element.

The pattern of the phosphor segments is determined by the course of the separating ribs and vice versa. In the embodiment shown in FIG. 1 the phosphor segments form an in-line strip pattern in which the phosphor segments form uninterrupted elongated strips. The color of the phosphor remains unchanged along a strip.

According to a further embodiment of the invention the individual phosphor strips can be divided into rectangular phosphor segments (Mondrian pixels) for the three primary colors which are arranged in a zigzag pattern or a dovetail pattern.

The phosphor segments for the primary colors red, green and blue each contain a red-, green- or blue-emitting phosphor. Particularly suitable phosphors are those which can be excited by the UV part of the radiation from the gas plasma.

Suitable red-emitting phosphors which can be excited by UV radiation are in particular phosphors with narrow band emission such as europium(III)-activated phosphors, in particular oxide, boride and vanadate, e.g. Y2O3:Eu, GdBO3:Eu, YBO3:Eu, (Y,Gd)BO3:Eu, YVO4:Eu, Y(V,B,P)O4:Eu.

Suitable blue-emitting phosphors which can be excited by UV radiation are phosphors activated by Eu(II), Tm(III) or Ce(III), such as europium-activated barium magnesium aluminate, thulium-activated lanthanum borate and cerium-activated yttrium silicate.

Suitable green-emitting phosphors which can be excited by UV radiation are phosphors activated by manganese (II) and terbium (III), such as manganese (II)-activated zinc silicate, terbium-activated yttrium gadolinium borate and manganese (II)-activated magnesium gallate.

Particularly suitable for the invention is europium-activated barium magnesium aluminate $BaMgAl_{10}O_{17}$:Eu as the blue-emitting phosphor, europium-activated yttrium oxide $Y_2O_3$:Eu or europium-activated yttrium gadolinium borate $(Y,Gd)BO_3$:Eu as the red-emitting phosphor and manganese-activated zinc silicate $Zn_2SiO_4$:Mn or manganese-activated barium aluminate $BaAl_{12}O_{19}$:Mn as the green-emitting phosphor.

In an embodiment of the invention the plasma color screen comprises a pixel matrix array in which every two pixels share a blue sub-pixel. The complete sequence for the sub-pixel arrangement comprises five sub-pixels i.e. two red sub-pixels, two green sub-pixels and one blue sub-pixel.

Figure 2:
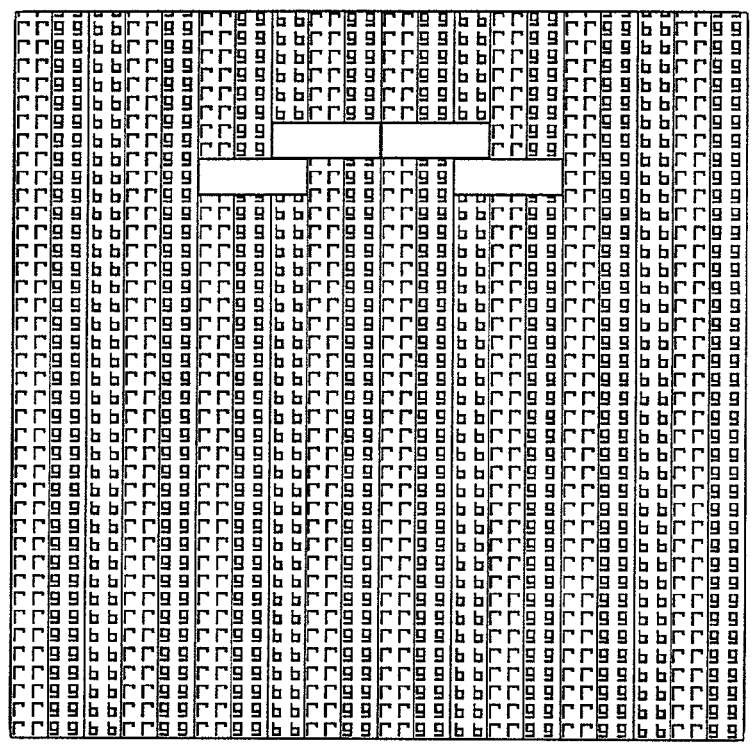
FIG. 2 shows diagrammatically an embodiment of a pixel matrix array for a plasma color screen according to the invention.
Figure 3:
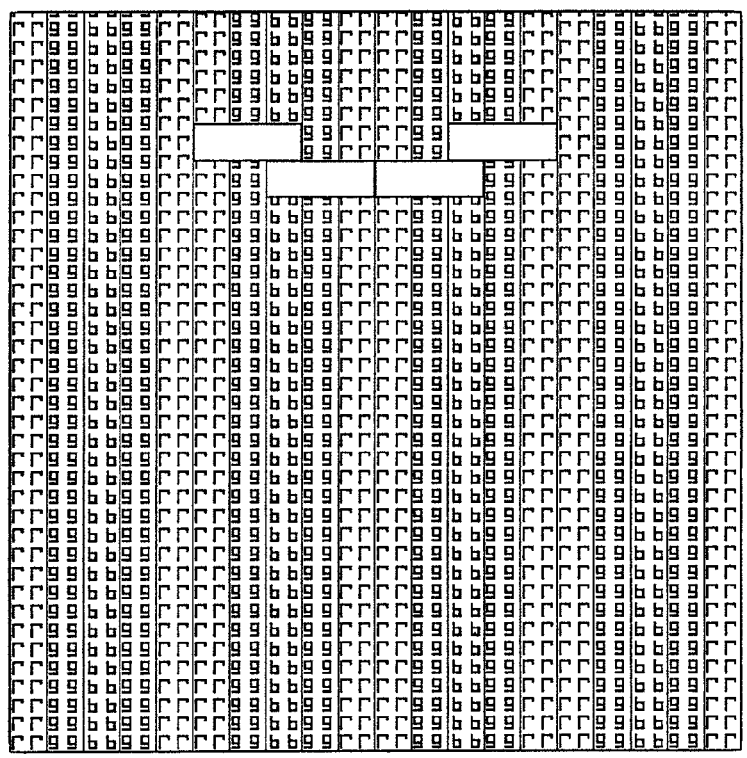
FIG. 3 shows diagrammatically an embodiment of a pixel matrix array for a plasma color screen according to the invention.

Two possible arrangements of sub-pixels are shown in FIGS. 2 and 3. FIG. 2 shows an arrangement of sub-pixels in the sequence RGBRG/RGBRG/RGBRG/ . . . , FIG. 3 shows an arrangement of sub-pixels in the sequence RGBGR/RGBGR/RGBGR./ . . . A further possible arrangement of the five sub-pixels is the sequence GRBRG/GRBRG/GRBRG/. . . .

Figure 4:
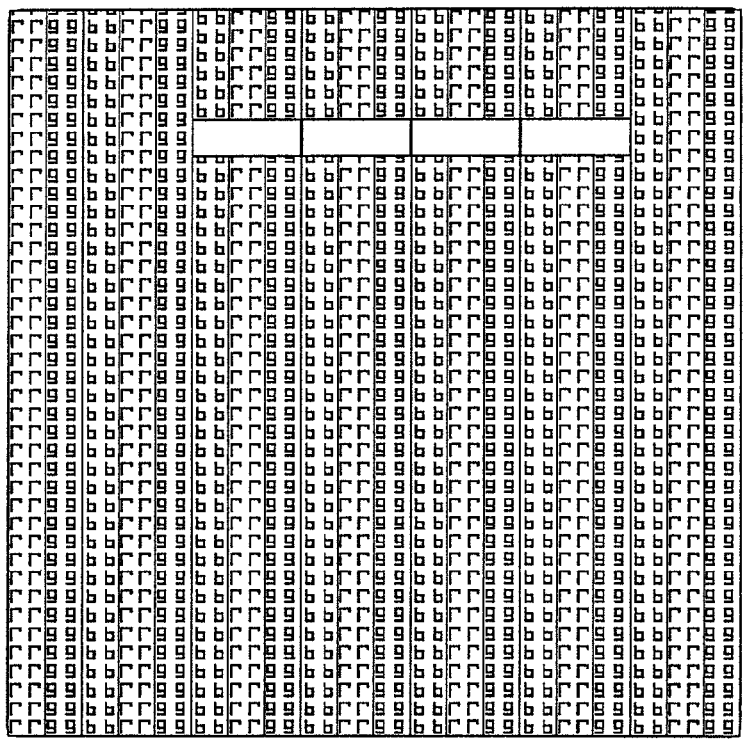
FIG. 4 shows diagrammatically an embodiment of a pixel matrix array for a plasma color screen according to the state of the art.

FIG. 4 shows the arrangement of six sub-pixels in red, green and blue for two pixels according to the state of the art. A comparison of the arrangements of the sub-pixels in FIG. 3 and FIG. 4 shows that the arrangement of sub-pixels according to the invention allows a reduction in pixel size of around 20%.

According to another embodiment of the invention the plasma color screen comprises a pixel matrix array in which every two pixels have a blue and a red sub-pixel in common. The complete sequence for two pixels comprises four sub-pixels i.e. a red sub-pixel, a blue sub-pixel and two green sub-pixels in the sequence RGBG/RGBG/RGBG . . . . A comparison of the arrangement of sub-pixels in this arrangement with that of sub-pixels in a conventional plasma color screen shows that the pixel size can be reduced by around 30%.

The discharge space is filled with a suitable discharge gas e.g. xenon, a xenon-containing gas, neon or a neon-containing gas. The gas discharge is ignited between the discharge electrodes 8 on the carrier plate. In the discharge zone the gas is ionized and a gas plasma is produced which emits UV radiation. The structured phosphor layer with the red, green and blue sub-pixels is excited picture element by picture element by the emitted UV radiation to emit light in the visible range, thereby forming the image impression. Due to the reduced number of blue and, where applicable, red sub-pixels, the luminance levels of the sub-pixels lie closer together and the image impression is improved.

What is claimed is:

1. A plasma screen comprising:
   a carrier plate,
   a transparent front plate,
   a ribbed structure which divides the space between the carrier plate and the front plate into discharge cells filled with a gas,
   one or more electrode arrays on the front plate and on the carrier plate to generate corona discharges in the discharge cells,
   a segmented phosphor layer, and
   a pixel matrix array that includes red discharge cells, green discharge cells and blue discharge cells that form a plurality of pixels,
   wherein
   each blue discharge cell is common to two adjacent pixels of the plurality of pixels.

2. The plasma color screen of claim 1, wherein the red, green, and blue discharge cells are arranged in parallel elongated channels.

3. The plasma color screen of claim 1, wherein the phosphor layer of the blue discharge cell contains europium(II)-doped barium magnesium aluminate.

4. The plasma color screen of claim 1, wherein each red discharge cell is also common to two adjacent pixels of the plurality of pixels.

* * * * *